(12) United States Patent (10) Patent No.: US 8,515,483 B2
Kuwahara et al. (45) Date of Patent: Aug. 20, 2013

(54) WIRELESS COMMUNICATION SYSTEM AND METHOD, AND BASE STATION APPARATUS

(75) Inventors: Mikio Kuwahara, Yokohama (JP); Hajime Kanzaki, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 13/021,030

(22) Filed: Feb. 4, 2011

(65) Prior Publication Data

US 2011/0223962 A1 Sep. 15, 2011

(30) Foreign Application Priority Data

Mar. 12, 2010 (JP) .................................. 2010-055419

(51) Int. Cl.
*H04B 7/24* (2006.01)

(52) U.S. Cl.
USPC ............ 455/522; 455/69; 455/13.4; 455/515; 370/318; 370/332

(58) Field of Classification Search
USPC ............... 455/522, 69, 13.4, 515, 464, 67.11, 455/115.1, 126, 127, 67.16, 135, 422, 560, 455/507; 370/318, 252, 253, 277, 278, 333, 370/235, 328, 310; 375/260
See application file for complete search history.

(56) References Cited

U.S. PATENT DOCUMENTS

| | | | |
|---|---|---|---|
| 6,628,921 B1 * | 9/2003 | Vaddiparty et al. | 455/12.1 |
| 7,634,289 B2 * | 12/2009 | Gervais et al. | 455/522 |
| 2002/0173302 A1 * | 11/2002 | Baker et al. | 455/422 |
| 2005/0222948 A1 * | 10/2005 | Sato et al. | 705/40 |
| 2006/0240859 A1 * | 10/2006 | Gervais et al. | 455/522 |
| 2008/0008110 A1 * | 1/2008 | Kishigami et al. | 370/310 |
| 2009/0059849 A1 * | 3/2009 | Namba et al. | 370/328 |
| 2010/0322073 A1 * | 12/2010 | Namba et al. | 370/235 |

OTHER PUBLICATIONS

3GPP TR 36.912 V2.2.0 (Sep. 2009), "3$^{rd}$ Generation Partnership Project; Technical Specification Group Radio Access Network; Feasibility Study for Further Advancements for E-Utra (LTE-Advanced) (Release 9)".
The Draft IEEE 802.16m System Description Document, 2009.

* cited by examiner

*Primary Examiner* — Tan Trinh
(74) *Attorney, Agent, or Firm* — Antonelli, Terry, Stout & Kraus, LLP.

(57) ABSTRACT

In a conventional cellular wireless communication system that included a plurality of base station apparatuses having a plurality of antennas, just two antennas were used for simultaneous transmission by transmission diversity, and the antenna usage efficiency was low. According to the present invention, a free transmission diversity antenna for transmission to the edge of a cell is used to send a signal to a terminal located around the center of the cell without causing interference to a terminal located around the edge of the cell. The two terminals located around the edge of the cell and around the center of the cell are paired for simultaneous signal transmission. A signal directed to the edge of the cell and a signal directed to the center of the cell are sent with greatly different transmission power. This reduces the interference caused by the signal directed to the center of the cell to an insignificant level for the terminal located around the edge of the cell. The terminal located around the edge of the cell does not appear to be affected by interference from signal transmission to the center of the cell and does not have to always use four antennas.

20 Claims, 21 Drawing Sheets

Spatial Multiplex(SM)

| | MS1 | MS2 |
|---|---|---|
| | 4 LAYERS | — |
| | 4 ANTENNAS | 4 ANTENNAS |
| | 2 LAYERS | 2 LAYERS |

Transmission Diversity(TD)

| | MS1 | MS2 |
|---|---|---|
| | 4 LAYERS | — |
| | 4 ANTENNAS | |

NOTE: THE NUMBER OF LAYERS EQUALS TO THE NUMBER OF ANTENNA PORTS.

FIG. 3

Spatial Multiplex(SM)

| CODE WORDS | LAYERS | MAPPING |
|---|---|---|
| 2 CODE WORDS | 4 LAYERS | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ |
| 1 CODE WORD | 2 LAYERS | $x^{(0)}(i) = d^{(0)}(2i)$<br>$x^{(1)}(i) = d^{(0)}(2i+1)$ |
| 2 CODE WORDS | 2 LAYERS | $x^{(0)}(i) = d^{(0)}(i)$<br>$x^{(1)}(i) = d^{(1)}(i)$ |

$d^{(0)}(i)$ : i-th DATA OF CODE WORD 0
$x^{(0)}(i)$ : i-th DATA OF LAYER 0

FIG. 4

Transmission Diversity(TD)

| CODE WORDS | LAYERS | MAPPING |
|---|---|---|
| 1 CODE WORD | 4 LAYERS | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$ |

$d^{(0)}(i)$ : i-th DATA OF CODE WORD 0

$x^{(0)}(i)$ : i-th DATA OF LAYER 0

FIG. 5

Transmission Diversity(TD)

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & 0 & -1 & 0 & 0 & 0 & j & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & 1 & 0 & 0 & 0 & -j \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix}$$

$y^{(0)}(i)$ : i-th DATA OF ANTENNA 0

$x^{(0)}(i)$ : i-th DATA OF LAYER 0

FIG. 6

| | i | i+1 | i+2 | i+3 | i+4 | i+5 | i+6 | i+7 |
|---|---|---|---|---|---|---|---|---|
| Ant port 0 | O | × | O | × | O | × | O | × |
| Ant port 1 | × | O | × | O | × | O | × | O |
| Ant port 2 | O | × | O | × | O | × | O | × |
| Ant port 3 | × | O | × | O | × | O | × | O |

O : OUTPUT
× : NO OUTPUT

| MS1 | MS2 | |
|---|---|---|
| 2 LAYERS (TD) | 2 LAYERS (TD) | 4 ANTENNAS |

O : OUTPUT
× : NO OUTPUT

| MS2 | i | i+1 | i+2 | i+3 | i+4 | i+5 | i+6 | i+7 |
|---|---|---|---|---|---|---|---|---|
| Ant port 0 | O | × | O | × | O | × | O | × |
| Ant port 1 | × | O | × | O | × | O | × | O |
| Ant port 2 | O | × | O | × | O | × | O | × |
| Ant port 3 | × | O | × | O | × | O | × | O |

| MS1 | i | i+1 | i+2 | i+3 | i+4 | i+5 | i+6 | i+7 |
|---|---|---|---|---|---|---|---|---|
| Ant port 0 | × | O | × | O | × | O | × | O |
| Ant port 1 | O | × | O | × | O | × | O | × |
| Ant port 2 | × | O | × | O | × | O | × | O |
| Ant port 3 | O | × | O | × | O | × | O | × |

Transmission Diversity(TD)    [FOR MS1]

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{P}} \begin{bmatrix} 1 & 0 & 0 & 0 & 0 & 0 & 0 & 0 \\ 0 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & -1 & 0 & 0 & 0 & j & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 0 & 0 & 1 & 0 & 0 & 0 \\ 0 & 0 & 0 & 0 & 0 & 0 & 0 & 0 \\ 0 & 0 & 0 & 0 & 0 & 1 & 0 & 0 \\ 0 & 0 & 0 & 0 & 0 & 0 & 0 & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix}$$

$y^{(0)}(i)$ : i-th DATA OF ANTENNA 0

$x^{(0)}(i)$ : i-th DATA OF LAYER 0

FIG. 12

WIRELESS COMMUNICATION SYSTEM AND METHOD, AND BASE STATION APPARATUS

CLAIM OF PRIORITY

The present application claims priority from Japanese patent application JP 2010-055419 filed on Mar. 12, 2010, the content of which is hereby incorporated by reference into this application.

BACKGROUND OF THE INVENTION

1. Field of the Invention

The present invention relates to wireless communication systems, methods therefor, and base station apparatuses, and more specifically, to a cellular wireless communication system for performing diversity transmission or channel allocation and the like through each base station apparatus having a plurality of antennas, a method thereof, and the base station apparatus.

2. Description of the Related Art (1) Cellular Communication

Mobile wireless communication generally uses the cellular system to cover a wide service area. In the cellular system, a plurality of base station apparatuses are placed scatteringly in the service area, and the areas covered by the individual base station apparatuses (areas where terminals can communicate) are combined to implement the wide service area. Each base station apparatus sends a reference signal for letting the base station apparatus be recognized. The reference signal is provided as a unique signal in a local area, in terms of transmission signal sequence, transmission time, frequency, or a combination of the transmission sequence, the transmission time, and the frequency. The terminal receives the unique reference signals sent from the base station apparatuses, measures and compares their signal intensities, and recognizes the radio conditions of the local station and adjacent base station apparatuses. The result of radio condition measurement is used to find a base station apparatus providing a higher signal intensity and better reception (and probably the shortest propagation distance). If it is judged that the base station apparatus providing the best reception changes from the currently connected base station apparatus to a different adjacent base station apparatus, a handover process is performed to switch to the base station apparatus that is excepted to provide better reception. In that way, cellular communication is implemented.

(2) Wireless Communication System

FIG. 1 shows the configuration of a wireless communication system.

The concept of cellular communication will be described again with reference to FIG. 1. As shown in the figure, the system has base station apparatuses 20, 21, and 22. A terminal 1 is communicating with the base station apparatus 20 by radio. The base station apparatuses 20, 21, and 22 are connected to a network apparatus 50 to have a wired communication path. An IP connection via a packet switch apparatus 40 is made between the network apparatus 50 and the base station apparatuses 20, 21, and 22. In the figure, the terminal 1 is communicating with the base station apparatus 20, which is the nearest and can provide good signal reception. The base station apparatuses 20, 21, and 22 send their reference signals, which are their identification signals. The terminal 1 receives the reference signals sent by the base station apparatuses and measures their signal intensities. The terminal 1 determines that the base station apparatus that provides the reference signal with the highest intensity is the nearest base station apparatus. The figure shows a downlink signal 30 (from the base station apparatus to the terminal) and an uplink signal 31 (from the terminal to the base station apparatus) of the base station apparatus 20. The base station apparatus 20 sends the downlink signal 30, the base station apparatus 21 sends a downlink signal 32, and the base station apparatus 22 sends a downlink signal 33. Since the downlink signals 30, 32, and 33 are sent at the same frequency at the same time, they can interfere with one another. The terminal 1 is located around the edge of the cell, and therefore receives a desired signal 30 from the base station apparatus 20 and also receives the signals 32 and 33 as interference waves from the other stations at the same time. The terminal 1 is affected by those signals. The ratio of interfering power and noise power to the desired signal power is called a signal interference and noise power ratio (SINR). Around the edge of the cell, interference from an adjacent cell increases and becomes a dominant term of the denominator. This worsens the SINR, making it difficult to transfer information at a high throughput.

RELATED ART LITERATURE

Non-Patent Literature 1: 3GPP TS36.912, 7.1 Downlink Spatial Multiplexing

Non-Patent Literature 2: IEEE 802.16m SDD, 11.8 Downlink MIMO Transmission Scheme

SUMMARY OF THE INVENTION

As described above as related art, a known OFDMA cellular communication method performs permutation to distribute logical subcarriers when allocating them to physical resources. The structure is known as a distributed structure. In a so-called localized structure, logical resources correspond to physical resources, and the resources are arranged to allow a single terminal to use continuous resources. The distributed structure makes it easy to provide a stable circuit quality because of the frequency diversity effect, so it can be used to provide a voice over IP (VoIP) and other services when a stable connection with QoS is demanded, for example. The localized structure makes it easy to allocate resources in such a manner that the frequency usage efficiency is maximized at that time, so it is expected to be used in best effort services and the like.

The standardization of IEEE 802.16m, LTE-Advanced, and other wireless communication systems as IMT-Advanced is currently discussed. In that discussion, use of up to eight antennas in the base station apparatus is considered to improve the efficiency. The number of antennas to be used has increased to exceed four, which have been defined for the multi-input multi-output (MIMO) system. A system has also been proposed to include a terminal having up to four antennas.

In those systems having a plurality of antennas, a high efficiency in frequency usage can be obtained by separating the plurality of antennas. When VoIP or other low-rate communication is provided to a terminal located around the edge between cells, for example, transmission diversity (TD) may be used for transmission because the diversity effect is required. VoIP, however, does not require a large packet size but requires stable communication. Even if the four antennas of the base station apparatus are used in that case, for example, just two antennas of the four are used for simultaneous transmission with TD, as described earlier. This transmission method cannot always be efficient. In some other cases, as the number of antennas increases, the antenna usage efficiency decreases.

In light of the problems described above, it is an object of the present invention to send a signal to a terminal located around the center of a cell by using a free transmission-diversity antenna for transmission to the edge of the cell, without interfering with a terminal located around the edge of the cell. Another object of the present invention is to improve the frequency usage efficiency.

According to the first solving means of the present invention, there is provided a wireless communication system comprising a plurality of base station apparatuses having a plurality of antennas, placed scatteringly in a service area to cover, wherein each of the plurality of base station apparatuses uses information on quality of a propagation channel or a channel state returned from a plurality of terminals, identifies at least two terminals A and B belonging to each of groups classified by the returned information, sends a signal to the terminal A with a predetermined reference power, determines the power of transmission to the terminal B on the basis of the information returned from the terminal A, and sends signals to the terminals A and B simultaneously or at the same timing or by the same resource element.

According to the second solving means of the present invention, there is provided a wireless communication method comprising a plurality of base station apparatuses having a plurality of antennas, placed scatteringly in a service area to cover, wherein each of the plurality of base station apparatuses uses information on quality of a propagation channel or a channel state returned from a plurality of terminals, identifies at least two terminals A and B belonging to each of groups classified by the returned information, sends a signal to the terminal A with a predetermined reference power, determines the power of transmission to the terminal B on the basis of the information returned from the terminal A, and sends signals to the terminals A and B simultaneously or at the same timing or by the same resource element.

According to the third solving means of the present invention, there is provided a base station apparatus having a plurality of antennas in a wireless communication system, the wireless communication system covering a service area by placing the base station apparatus at a plurality of points scatteringly in the service area, the base station apparatus comprising:

a processor which uses information on quality of a propagation channel or a channel state, returned from a plurality of terminals, identifies at least two terminals A and B belonging to each of groups classified by the returned information, and determines the power of transmission to the terminal B or a power control value for determining the transmission power, on the basis of the information returned from the terminal A; and a transmission signal processing unit which sends a signal to the terminal A with a predetermined reference power, determines the power of transmission to the terminal B in accordance with the transmission power or power control value given by the processor, and sends signals to the terminals A and B simultaneously or at the same timing or by the same resource element.

ADVANTAGES OF THE INVENTION

A system having a plurality of antennas according to the present invention can send a signal to a terminal located around the edge of a cell, maintaining a high diversity effect while sending a signal to a terminal located around the center of the cell at the same time by using a free antenna. For example, when VoIP terminals are placed around the center of a cell and around the edge of the cell, the system can send signals to the terminals simultaneously by using the same resource. This can improve the frequency usage efficiency.

BRIEF DESCRIPTION OF THE DRAWINGS

FIG. 3 illustrates the specifications of a layer mapper in related art.

FIG. 4 illustrates signal processing (for SM) of the layer mapper in related art.

FIG. 5 illustrates signal processing (for TD) of the layer mapper in related art.

FIG. 6 illustrates the operation of a TD precoder in related art.

FIG. 7 illustrates the antenna port output of the TD precoder in related art.

FIG. 9 illustrates the specifications of a layer mapper in an embodiment.

FIG. 11 illustrates the antenna port output of a precoder of each terminal in the embodiment.

FIG. 12 illustrates the operation of the precoder (for the terminal 1) in the embodiment.

DESCRIPTION OF THE PREFERRED EMBODIMENTS

1. Related Art

Figure 1:
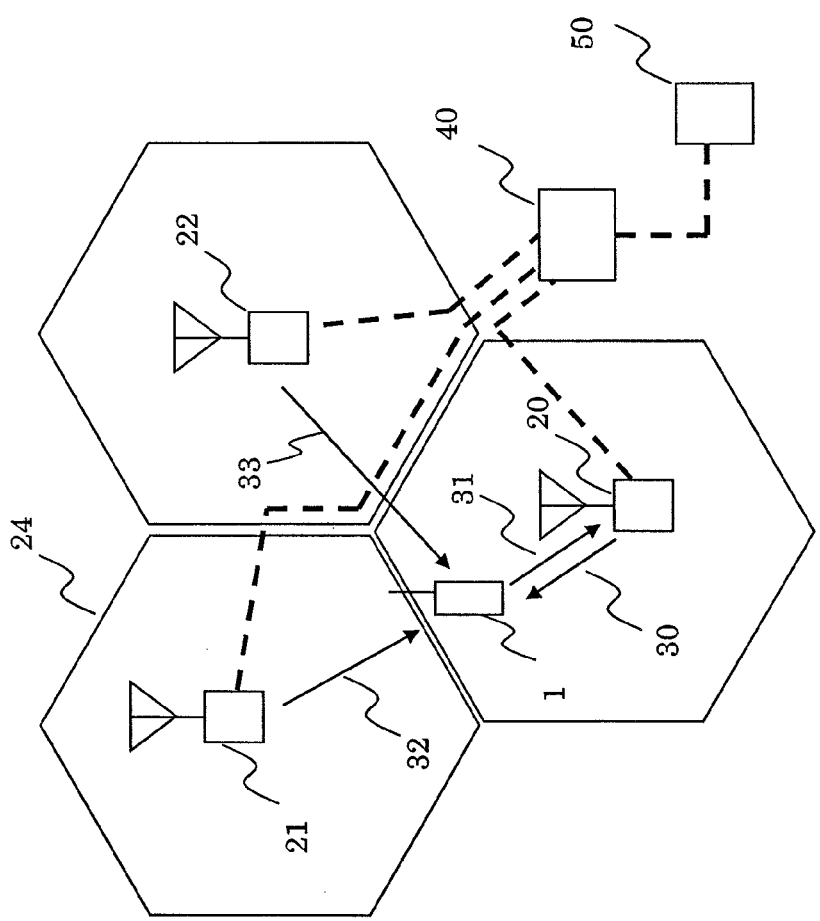
FIG. 1 shows the configuration of a wireless communication system.
Figure 2:
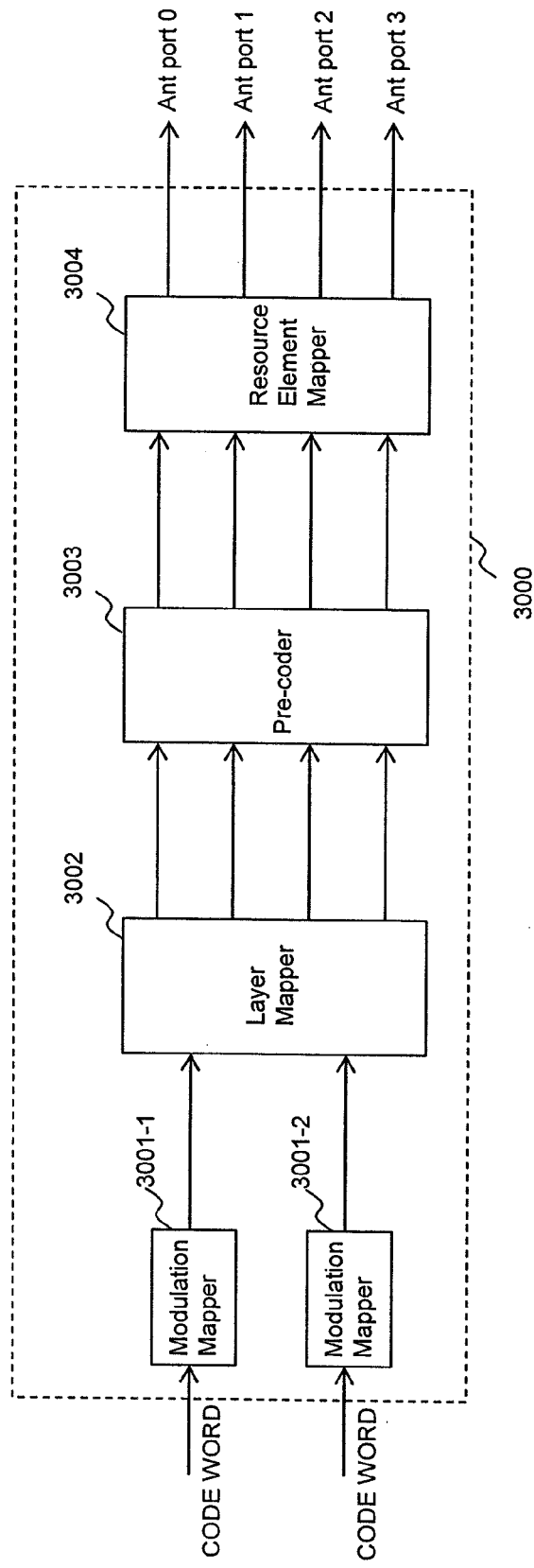
FIG. 2 shows the configuration of a transmission signal processing unit in related art.

FIG. 2 shows the configuration of a transmission signal processing unit in related art. The figure shows a transmission signal processing unit 3000 of the Long Term Evolution (LTE) standard discussed by a standard organization known as the 3rd Generation Partnership Project (3GPP). In the example shown in FIG. 2, the transmission signal processing unit receives two code words and sends signals from its four antennas. Modulation mappers 3001 convert the input code words to modulation signals. The modulation Signals are signals having a signal constellation in the IQ plane, as in QPSK, 16QAM, and 64QAM. The modulation signals are input to a layer mapper 3002. The layer mapper 3002 maps the sequence of modulation signals to a plurality of layers in that order.

FIG. 3 illustrates the specifications of a layer mapper in related art. The figure shows types of layer mapping for the LTE when four antennas are used. As shown in FIG. 3, mapping can be divided broadly into spatial multiplex (SM) and transmission diversity (TD). As the SM, a method of allocating all the four layers to a single terminal (MS1) and a method of allocating two layers to each of two terminals (MS1 and MS2) are shown. As the TD, a method of allocating all the four layers to a single terminal (MS1) is shown. On the analogy to the SM, it might be possible to expect that the TD includes a method of allocating two layers to each of two terminals (MS1, MS2), but actually in the TD, a single terminal must use all the four antennas. This is because transmission to another terminal appears to be interference on the same level. This would degrade the quality of communication and disable communication. In related art, in the TD, the same frequency resource cannot be allocated to two terminals.

FIG. 4 shows an example of layer mapping in the LTE SM. An example of generating four layers from two code words, which is shown as "two code words" and "four layers" in the hatched first row, will now be described. A rule for mapping two code words to four layers is shown in the first row. In that rule, for example, $d^{(0)}(i)$ represents the i-th data of code word 0, and $x^{(0)}(i)$ represents the i-th data of layer 0. The input signal d has two code words (0) and (1). From each of the code words, the $2i$-th and $(2i+1)$-th information is taken out and mapped to the i-th positions in the four x layers (0), (1), (2), and (3). In the examples shown in the other rows, such as generating two layers from a single code word, the signal is mapped to corresponding layers in accordance with the corresponding rule shown in the figure.

FIG. 5 shows an example of layer mapping in the TD. In the figure, $d^{(0)}(i)$ represents the i-th data in code word 0, and $x^{(0)}(i)$ represents the i-th data of layer 0. In the shown example, the data items of a single code word are mapped to four layers.

The description of the transmission signal processing unit 3000 will be continued, with reference to FIG. 2. The outputs of the layer mapper 3002 are input to a precoder 3003. The precoder 3003 multiplies the input signals by prescribed weights. The method of generating the prescribed weights depends on whether the transmission method is the SM or TD, as will be described below.

In the SM, a list of predetermined weight choices, which is referred to as a code book, is provided, for example. The terminal observes the reception state of a pilot signal and returns the identifier of an appropriate weight to the base station apparatus. The base station apparatus selects an appropriate array weight in accordance with the returned identifier.

In the TD, two antennas send signals coded by Alamouti's coding or the like, for example. For that purpose, the signals are output after they are multiplied by predetermined array weights.

FIG. 6 illustrates the operation of a TD precoder in related art. The figure shows the weight of the TD in the LTE. In the figure, x represents the input signal, and y represents the output signal connected to an antenna port. Re( ) represents a function that takes out the real part of a complex number; Im( ) represents a function that takes out the imaginary part of a complex number; and i represents a resource at a specific timing and a specific frequency. In the TD operation, signals are sent from two antennas selected from the four antennas. In the resource $4i$, for example, the precoder outputs $y^{(1)}(4i)$ and $y^{(3)}(4i)$ are 0, and $y^{(0)}(4i)$ and $y^{(2)}(4i)$ have values. This means that just antenna ports 0 and 2 send signals. At a timing $4i+2$, the precoder outputs $y^{(0)}(4i+2)$ and $y^{(2)}(4i+2)$ are 0, and $y^{(1)}(4i+2)$ and $y^{(3)}(4i+2)$ have values. This means that just antenna ports 1 and 3 send signals.

With reference to FIG. 2 again, the signals multiplied by the array weights by the precoder 3003 are input to a resource element mapper 3004. The resource element mapper 3004 maps the signals to resources (or resource elements) determined by a predefined logical resource i and a specific frequency or a symbol (timing) such as an OFDM symbol. For example, serially input signals i, i+1, i+2, and i+3 are mapped to resources determined by a scheduler, for example, to frequencies (subcarriers) a, a+1, a+2, and a+3, of an OFDM symbol a. The signals are mapped on the antenna basis. In the example shown in FIG. 2, the output signals to the four antenna ports are generated.

FIG. 7 shows a table indicating whether each TD resource element has output or not. In the table, i, i+1, i+2, and so on are resource element numbers. For example, in the resource element i, antenna ports 0 and 2 output, but antenna ports 1 and 3 do not output. In the next resource element i+1, antenna ports 1 and 3 output, but antenna ports 0 and 2 do not output. This operation is determined by the precoder 3003 shown in FIG. 2.

Figure 8:
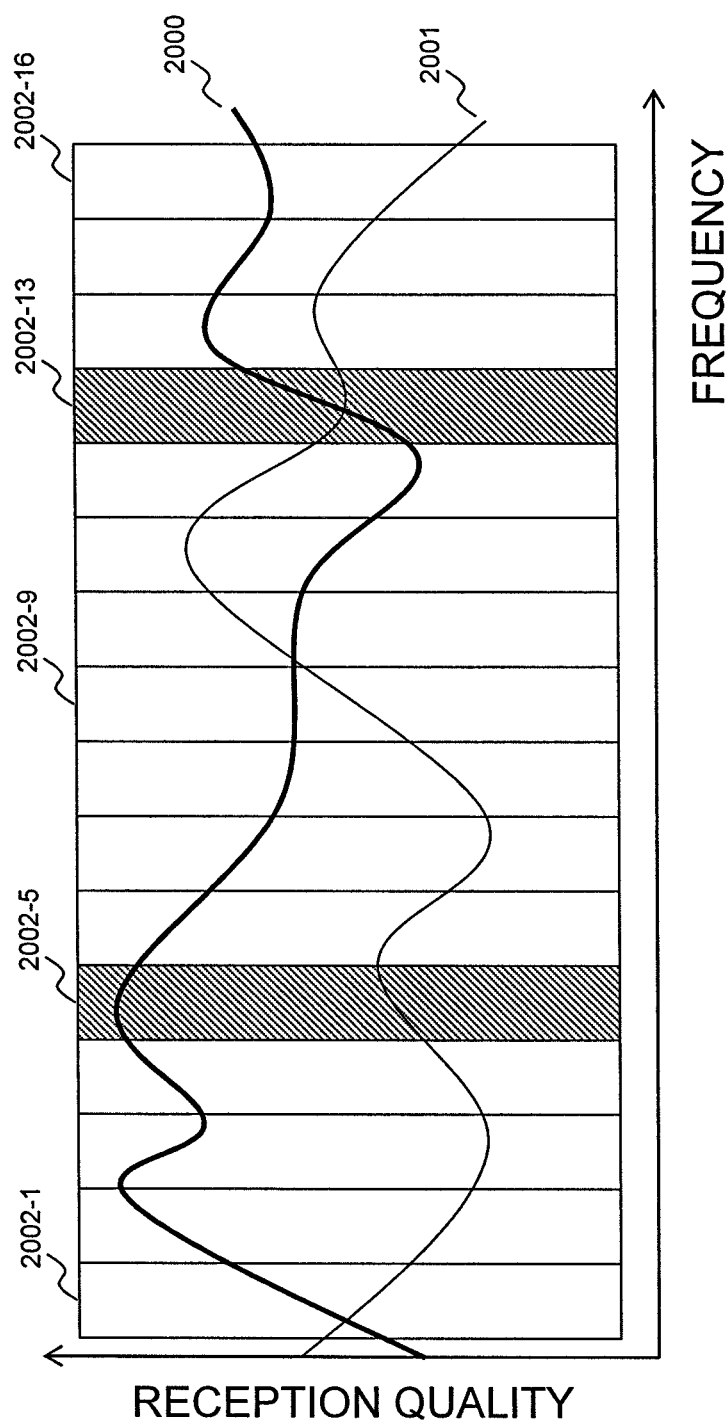
FIG. 8 shows that propagation channels for terminals have different frequency characteristics.

FIG. 8 illustrates the influence of a frequency fluctuation on the frequency axis of a broadband system. The resources received by terminals have frequency characteristics as indicated by a curve 2000 or 2001 in the figure. This is because the radio propagation channel is subjected to multipath phasing. To obtain a frequency diversity effect, resources separated from each other in frequency, such as hatched resources 2002-5 and 2002-13 in the figure, should be combined to send a single code word. For that purpose, even a relatively small-size code word should be mapped to discrete resources.

2. Transmission

In some fourth-generation communication systems, using a base station apparatus or terminal with four or more antennas is proposed. In the LTE-Advanced discussed by the 3GPP and IEEE 802.16m discussed by the IEEE, for example, the base station apparatus would have up to eight antennas, and the terminal would have four antennas.

The conventional TD methods have been reviewed, and the present invention provides a new way to send low-rate packets to users located around the edge of a cell and around the center of the cell simultaneously by using a free antenna.

FIG. 9 illustrates the specifications of a layer mapper according to an embodiment of the present invention. The figure shows an example of a TD system disclosed in this embodiment. A base station apparatus has four antennas. A terminal MS1 located around the center of a cell performs TD of two layers, and a terminal MS2 located around the edge of the cell performs TD of two layers. The base station apparatus transfers different information to the two terminals simultaneously by using the same resource. This system is conventionally known as multi-user MIMO (MU-MIMO) but differs from a conventional system in the following two points.

Firstly, the two terminals located around the edge of the cell and around the center of the cell are paired, and the signals are sent simultaneously.

Secondly, the signals directed to the edge of the cell and the center of the cell are sent with greatly different transmission power. This reduces interference by the signal directed to the center of the cell to an insignificant level for the terminal located around the edge of the cell. The terminal located around the edge of the cell does not appear to be affected by interference from signal transmission to the center of the cell and does not have to always use the four antennas.

Figure 10:
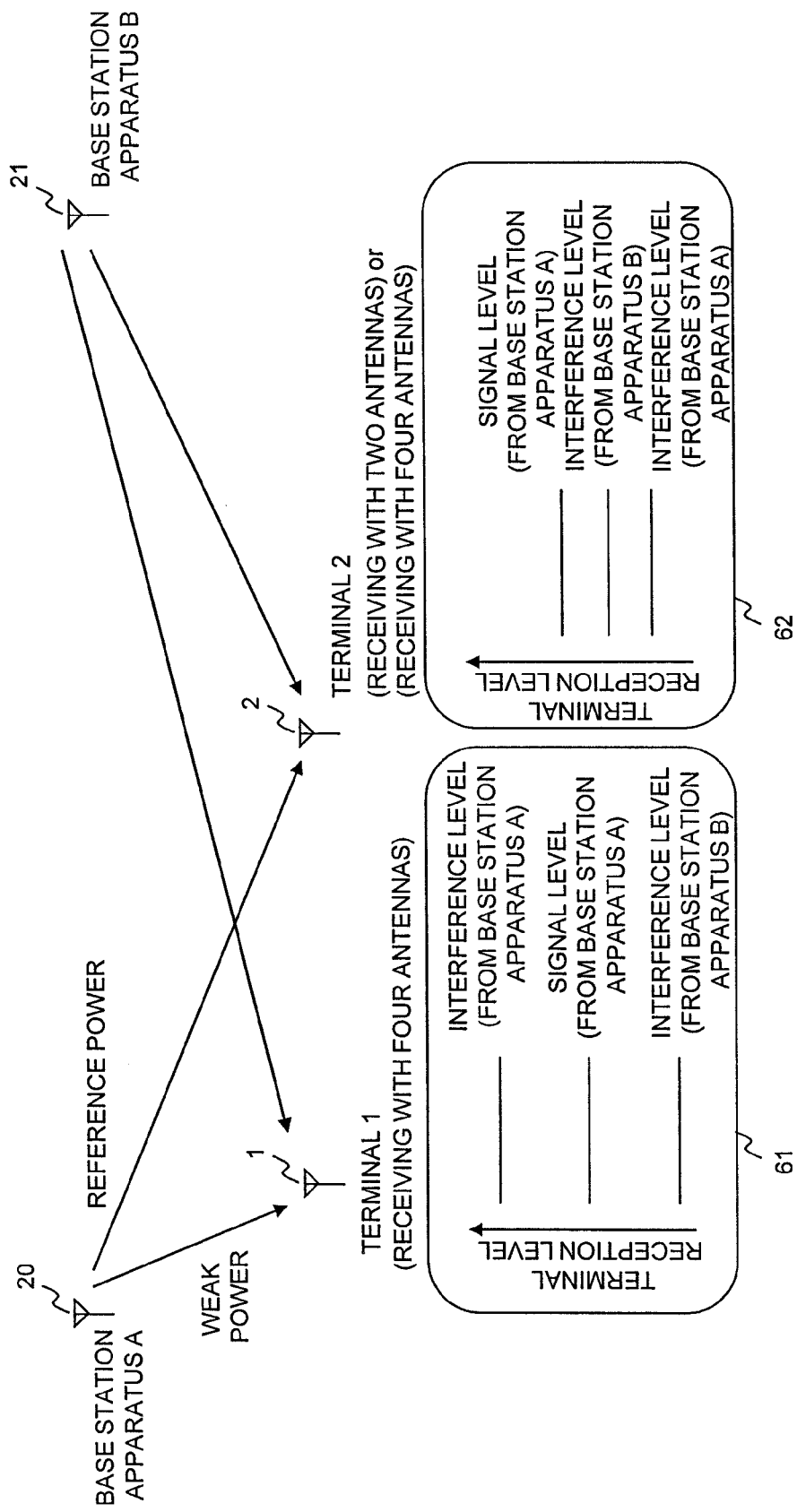
FIG. 10 shows the positions of terminals 1 and 2 with respect to base station apparatuses in the embodiment.
Figure 21:
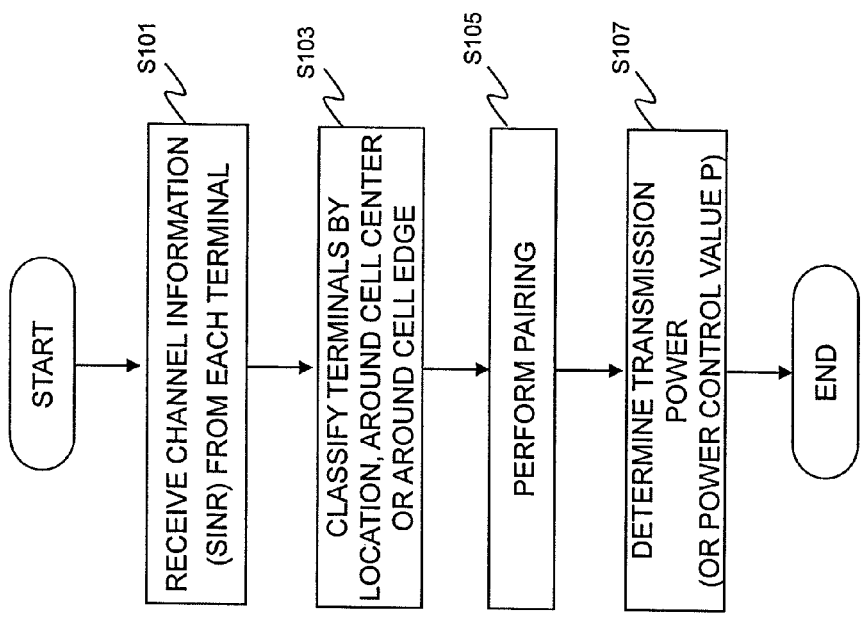
FIG. 21 is a flowchart of pairing and transmission power control executed by a CPU or digital signal processor (DSP) in a base station apparatus.

FIG. 10 shows the positions of terminals 1 and 2 with respect to base station apparatuses in the embodiment. FIG. 21 shows a flowchart of pairing and transmission power control executed by a CPU or DSP in each base station apparatus. With reference to FIGS. 10 and 21, processing concerning the two terminals in the embodiment will be described.

First suppose that the two terminals are connected to a base station apparatus A (20). An adjacent base station apparatus B (21) can be an interference source. Of the two terminals, the terminal 1 is located close to the base station apparatus A (20), or around the center of the cell, and the terminal 2 is located around the edge between the base station apparatuses A and B, or around the edge of the cell. The base station apparatuses A and B send different pilot signals. The terminals 1 and 2 receive the pilot signals sent from the base station apparatuses A and B and measure their reception levels. In other words, the terminals 1 and 2 measure the level of the signal coming from the currently connected base station apparatus A (20) and the level of interference from the base station apparatus B. The terminals 1 and 2 calculate the SINRs from the two sets (61, 62) of measurement results. Although the SINR is described in this example, feedback information or information indicating the channel state may be used instead.

Each terminal reports the calculated SINR to the base station apparatus A (20). The base station apparatus A (20) receives the SINR (S101). The base station apparatus A (20) estimates the position of the terminal from the SINR reported from the terminal and judges whether the terminal is located around the center of the cell or around the edge of the cell (S103). In a preferred embodiment, the reported value of SINR is compared with a first threshold predetermined by the base station apparatus. If the reported SINR value is higher than the threshold, the corresponding terminal is determined to be around the center of the cell. The value is also compared with a predetermined second threshold, and if the reported SINR value is lower than the second threshold, the corresponding terminal is determined to be around the edge of the cell. If the SINR value is between the first threshold and the second threshold, the corresponding terminal is determined to be the rest. The base station apparatus can specify these thresholds beforehand in a memory or the like. For example, a terminal with a SINR of 20 dB or higher can be determined to be around the center of the cell, and a terminal with a SINR of 0 dB or lower can be determined to be around the edge of the cell. These determinations are made by the CPU or DSP in the base station apparatus.

Pairing is performed for the terminals determined to be located around the center of the cell, around the edge of the cell, or the rest (S105). Paring begins with determining from TD transmission to the edge of the cell whether there is a terminal. If there is TD transmission to a terminal located around the edge of the cell, the SINR reported by that terminal is checked. If the reported SINR is higher than a predetermined third threshold, it can be determined that pairing is possible. A group of terminals located around the center of the cell is searched for a terminal with a small amount of transmission buffer, for example. The found terminal is checked if pair transmission with the terminal located around the edge of the cell is possible. If it is judged that the found terminal does not have sufficient resources for the QoS requirement, pairing with the found terminal is given up, and a different terminal can be found. In that way, an appropriate partner is found. Pairing is determined also by the CPU or DSP in the base station apparatus.

The thresholds can be specified beforehand to such levels that the first threshold is higher than the second threshold and the second threshold is higher than the third threshold. Instead of specifying the first threshold and the second threshold, just a single threshold may be specified. In that case, if the SINR is higher than the threshold, it can be determined that the corresponding terminal is located around the center of the cell. If the SINR is lower than the threshold, it can be determined that the corresponding terminal is located around the edge of the cell.

The base station apparatus in a first embodiment of the present invention uses the SINR reported from the terminal 2 that is determined to be located around the edge of the cell to determine the power of transmission to the terminal 1 (or a power control value P for determining the transmission power) (S107). With reference to the transmission power to the terminal 2, the transmission power to the terminal 1 should be lower than the level of interference from the adjacent base station apparatus, which can be predicted from the SINR reported from the terminal 2. The transmission power or the power control value P is determined also by the CPU or DSP in the base station apparatus.

Suppose that the SINR value reported from the terminal 2 is 0 dB. Then, the base station apparatus A (20) determines the transmission power to the terminal 1 to −5 dB, for example, which is a level sufficiently lower than the reference power of signal transmission to the terminal 2. Specifically, if the power of signal transmission to the terminal 2 is 5 W per antenna, the power of signal transmission from the base station apparatus A (20) to the terminal 1 is reduced by 5 dB to 1.7 W. Then, the terminal 2 receives the signal sent from the base station apparatus A (20) to the terminal 1 with 1.7 W, at a level (62) sufficiently lower than interference from the adjacent base station apparatus. Therefore, signal transmission from the base station apparatus A to the terminal 1 hardly affects radio transmission to the terminal 2. The terminal 1 receives a signal with its four antennas. Since the terminal 1 is close to the base station apparatus A (20) and apart from the base station apparatus B (21), the terminal 1 can receive the pilot signals sent from the antennas of each base station apparatus with a high quality. Consequently, the propagation channel can be estimated with a high level of accuracy. Therefore, the interference wave sent from the base station apparatus A (20) to the terminal 2 can be eliminated fairly. Since the interference can be eliminated, the terminal 1 can receive a signal at a low throughput. Because the terminal 1 is close to the base station apparatus, uplink signal transmission can be performed adequately with a low transmission power. Even if the four antennas are used to receive the signal, the power consumption is lower than that by the terminal located around the edge of the cell. The terminal located around the edge of the cell can secure its uplink communication channel only by signal transmission with a high power. Accordingly, when a downlink signal is received, the number of antennas should be reduced as much as possible. In this embodiment, the terminal located around the edge of the cell can obtain a sufficient diversity effect in reception even by two antennas. Therefore, the embodiment of the present invention can also produce a great effect in terms of power consumption.

FIG. 11 illustrates the antenna port outputs of the precoder of each terminal in the embodiment. The shown table indicates whether each resource element has an output. In the table, i, i+1, i+2, and so on are resource element numbers. Data signals sent from a plurality of antennas to a plurality of terminals are allocated in such a manner that an antenna port is used exclusively for a terminal in each resource element. For example, in the resource element i, the terminal 2 (MS2) has outputs from antenna ports 0 and 2 and no output from antenna ports 1 and 3. The terminal 1 (MS1) in the resource element i has outputs from antenna ports 1 and 3 and no output from antenna ports 0 and 2. This operation is determined by a precoder 4003 shown in FIG. 20.

FIG. 12 illustrates the operation of the precoder (for the terminal 1) in the embodiment. The LTE and other related art has just one TD method, in which a single code word is mapped to four layers as shown in FIG. 5, and the signals are sent by selecting two antennas for each resource, from the four antennas as shown in FIGS. 6 and 7. The base station apparatus in the embodiment of the present invention precodes the signals of the terminal 2 in accordance with the weights shown in FIG. 6 and precodes the signals of the terminal 1 in accordance with the weights shown in FIG. 12. With those weighted signals, the TD transmission to the two terminals can be performed simultaneously by using the same resource.

3. Apparatus

Figure 20:
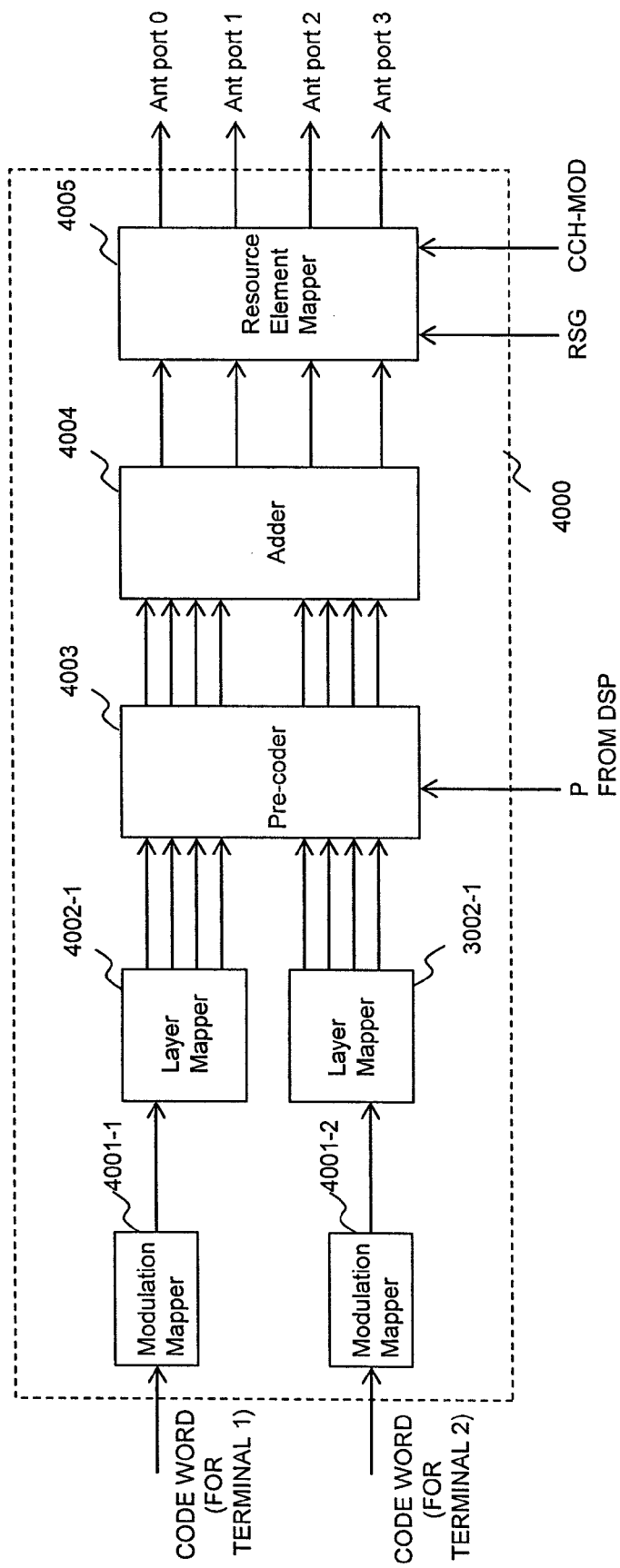
FIG. 20 shows the configuration of a transmission signal processing unit 4000 in the embodiment.

FIG. 20 shows the configuration of a transmission signal processing unit 4000 in the embodiment. In the figure, two code words are directed to the terminals 1 and 2 respectively. The code words are input to modulation mappers 4001-1 and 4001-2. The modulation mapper 4001-1 converts the input code word to modulation signals. The modulation signals are signals having a signal constellation in the IQ plane, as in QPSK, 16QAM, and 64QAM. The modulation signals are input to a layer mapper 4002. The layer mapper 4002 maps each code word to four layers, as shown in FIG. 5. The precoder 4003 performs weighted integration shown in FIG. 12 of the data for the terminal 1 and the weighted integration shown in FIG. 6 of the data for the terminal 2. As shown in FIG. 20, the precoder has an input P, and the signal power of the data directed to the terminal 1 is controlled in accordance with the input P, as shown in FIG. 12. The multiplier is $1/\sqrt{P}$ in FIG. 12, but any other appropriate value such as 1/P can be the multiplier. An adder 4004 adds the modulation signals created for each code word are added on the antenna basis and on the resource basis. The added signals are input to a resource element mapper 4005. The resource element mapper 4005 maps logical resources to physical resources, as in related art. The resource mapper also maps the reference signal generated by a reference signal generator (RSG) 516, which will be described later, shown in FIG. 13, and control channel information generated through a control channel modulation (CCHMOD) unit 515, to physical resources.

The way of obtaining the input (power control value) P will now be described. The power control value P is determined by the CPU or DSP in the base station apparatus. The base station apparatus receives the channel state (SINR and the like) returned from the terminal 2. The returned information is reported as control information from the terminal to the base station apparatus. The base station apparatus compares the SINR with a predetermined third threshold. If the reported value is higher than the threshold, the P is determined in accordance with the reported SINR. If the SINR is −1 dB, the scheduler of the base station apparatus determines the power control value P of the precoder 4003 so that the output becomes −1 dB-TH with respect to the reference power, where TH is a predetermined value stored in the base station apparatus.

The DSP may obtain the transmission power directly, instead of the power control value P, and may give the transmission power to the transmission signal processing unit 4000.

In the new procedure in the embodiment, in addition to the signal transmission to the terminal 2, which is conventionally possible, communication to the terminal 1 can be performed at a low rate by using the same resource. The procedure can be used for continuous transmission of small packets, especially in VoIP and machine-to-machine communication. The corresponding problems are solved.

Figure 13:
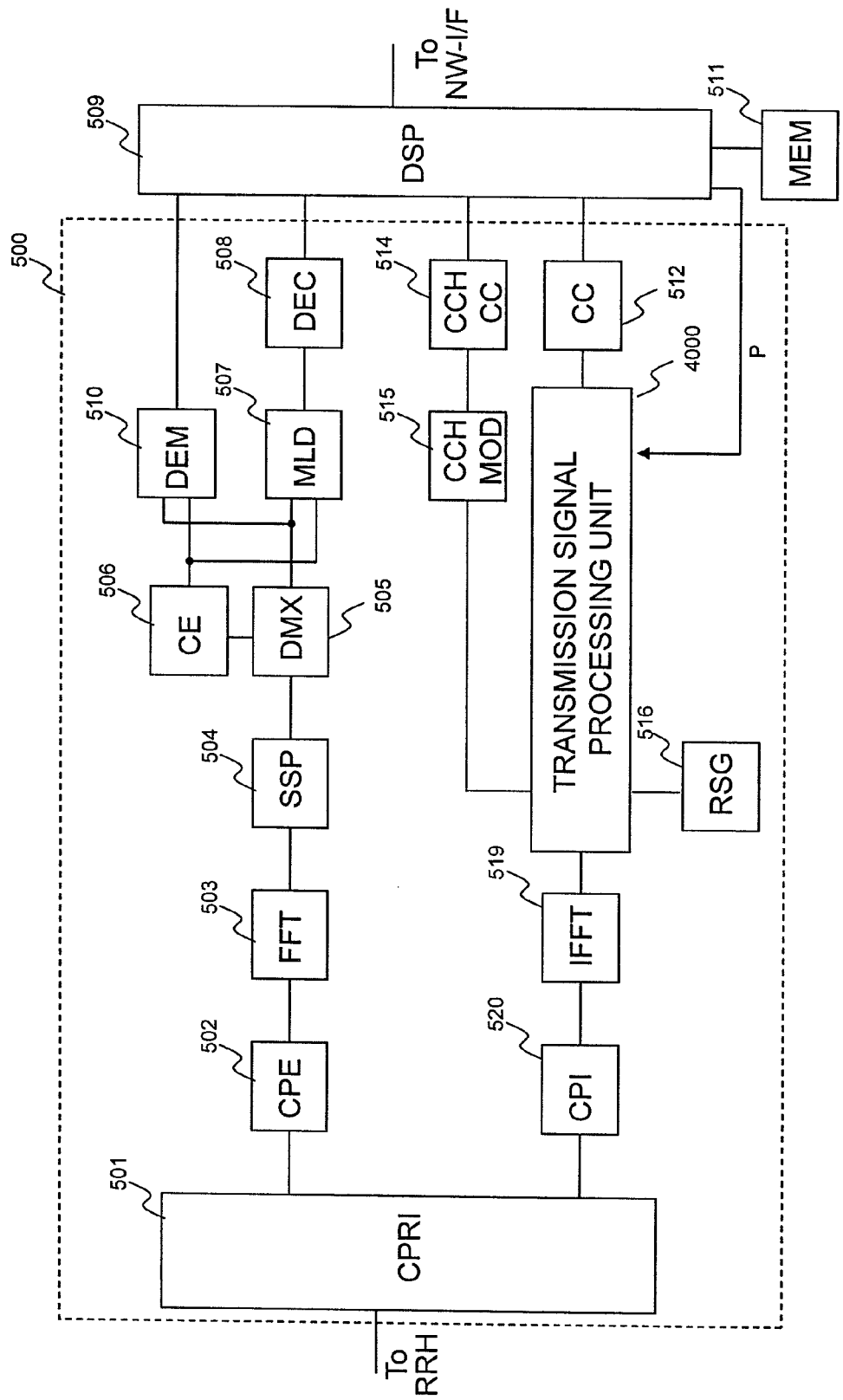
FIG. 13 shows the configuration of a baseband unit in the embodiment.
Figure 14:
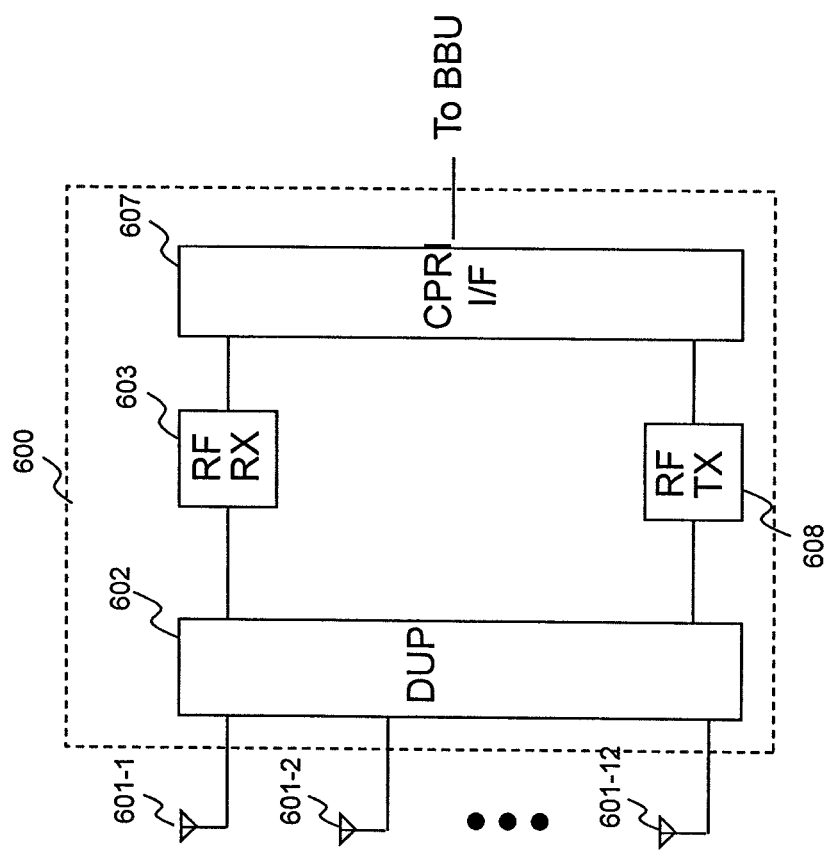
FIG. 14 shows the configuration of a remote radio head (RRH) in the embodiment.

FIG. 13 shows an example configuration of a baseband unit of the base station apparatus in the embodiment. The shown configuration includes the transmission signal processing unit 4000, which is described earlier. FIG. 14 shows a radio frequency (RF) unit in a remote radio head (RRH). The baseband unit and the RF unit are connected by a common public radio interface (CPRI). The embodiment is described for a frequency division duplex (FDD) system.

In FIG. 14, the signals received by a plurality of antennas 601 are divided to an uplink signal (sent from the terminal to the base station apparatus) and a downlink signal (sent from the base station apparatus to the terminal) by a duplexer 602. The uplink signal is sent to an RX 603. The RX 603 performs amplification, frequency conversion, digitalization, and other signal processing, and sends the result to a CPRI 607. The CPRI 607 converts the signal into the CPRI format and sends the signal to the baseband unit indicated as Port 0 in the figure.

In FIG. 13, the signal received from the RF is input from the left side of the figure to a CPRI 501, where the signal is converted to a 16-bit IQ signal for a plurality of antennas. A CP extractor (CPE) 502 removes a cyclic prefix (CP) from the converted signal for each antenna. The CP is a redundant signal inserted to improve the resistance of the OFDM signal to the delay wave. The signal after the removal of the CP is converted to information in the frequency domain by a fast Fourier transform (FFT) unit 503. The converted information in the frequency domain is formed as a digital beam, and the antenna element information is changed to beam element information by a spatial signal processor (SSP) 504. The antenna element information here is received by each antenna with the resolution of the antenna. The beam element information is weighted information on the bean space obtained by processing the signals received by the plurality of antennas. The beam element information is separated to resource elements in accordance with the OFDM symbol and the resolution of the subcarrier by a demultiplexer (DMX) 505. This processing is called demapping. The demapped information includes a reference signal. The reference signal is sent to a channel estimation (CE) unit 506 and used to estimate the propagation channel. The CE unit can also use the reference signal to estimate interference waves from a terminal connected to an adjacent base station apparatus, for example. The estimated propagation channel is used to detect transmission data. Any change in the estimated propagation channel on the time base is detected to estimate the mobility or the moving speed of the mobile terminal. Alternatively, propagation loss is estimated from the value related to transmission power, reported from the terminal. The estimated moving speed and propagation loss are taken into the DSP and used to shift the mode of the downlink circuit. The transmission data includes user data and control data. The control data is detected and decoded by a demodulator (DEM) 510, and the result is passed to a DSP 509. The user data is subjected to MLD processing in the maximum likelihood detector (MLD) 507, by using the estimated propagation channel. A log likelihood ratio (LLR) obtained as the result is used in decoding by a decoder (DEC) 508, and the decoded signal is passed to the DSP 509. The DSP collects the estimated channel, decoded control data, decoded user data and the like from the CE 506, and sends the user data through a network interface to a network. The estimated channel and control information are stored in a memory 511 and used to control a packet scheduler configured in the DSP. The signal quality (SINR and the like) of the downlink circuit estimated by the terminal is received as a control channel by the base station apparatus. The control information is stored in the memory 511 in the DSP 509.

In FIG. 13, the downlink signal sent from the network is stored temporarily in the memory 511 of the DSP 509. The scheduler included in the DSP 509 determines the transmission timing, transmission beam, transmission resource block, modulation method, whether the terminal is located around the center of the cell or around the edge of the cell, and paring of the terminals located around the center of the cell and around the edge of the cell in this embodiment. In accordance with the determinations, the transmission signal is produced. The user data taken from the memory 511 is input to the transmission signal processing unit 4000, and the transmission signal illustrated in FIG. 20 is generated. The RSG 516 generates a reference signal (or a pilot signal). A control channel coder (CCHCC) 514 is a block for coding the control information generated by the DSP 509, and the CCHMOD 515 is a block for modulating the coded control information. In the transmission signal processing unit 4000, a resource mapper that includes the information generated by the RSG 516 and the CCHMOD 515 performs mapping to physical resources. The mapped information of each antenna element in the frequency domain is converted to a time-domain signal by an inverse FFT (IFFT) unit 519. The obtained time domain signal is given a CP by a cyclic prefix inserter (CPI) 520, and the CPRI 501 converts the signal to the CPRI and sends the signal to the RF unit (RRH).

The information sent from the baseband unit in FIG. 14 is input through the CPRI 607 to a TX 608 for modulation and power amplification. The information is sent through the duplexer 602 to the antennas 601.

The duplexer 602 was described for the FDD system with reference to FIG. 8. A time division duplex (TDD) system can also be implemented in the embodiment of the present invention. In that case, the duplexer 602 is replaced with a switch.

The memory 511 shown in FIG. 13 stores the first to third thresholds, the predetermined TH, and other values, which are described in the algorithm. The DSP 509 reads the values from the memory when necessary and makes a comparison related to the algorithm. The values stored in the memory can be changed from an external apparatus such as a base station apparatus control apparatus.

Figure 19:
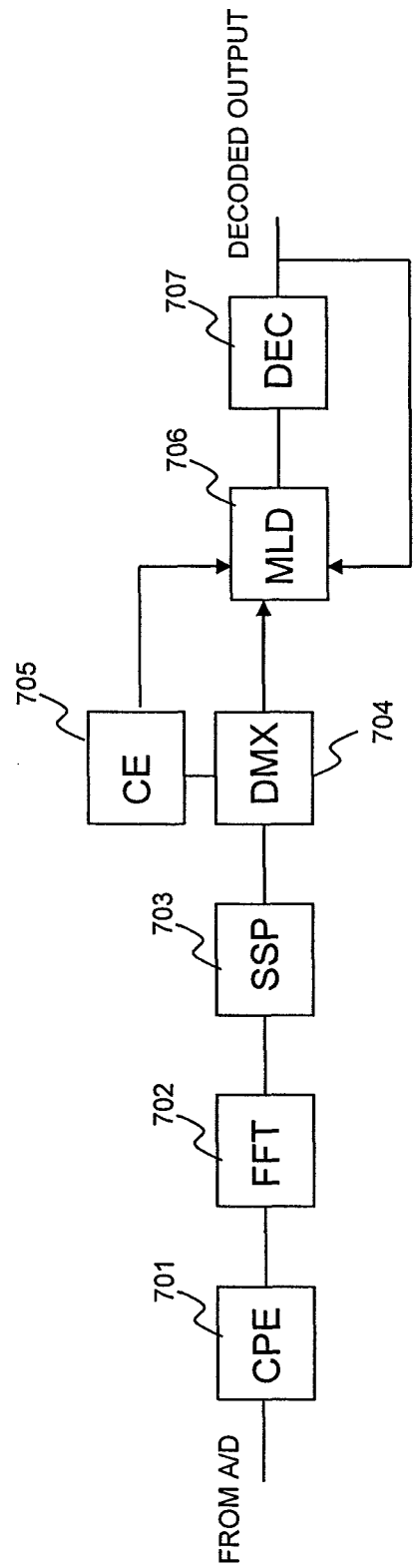
FIG. 19 shows the configuration of an interference eliminator provided for the terminal 1.

FIG. 19 shows the configuration of an interference eliminator provided for the terminal 1. The figure illustrates a first mechanism concerning the interference eliminator included in the terminal 1. A CPE 701 removes the CP from the reception signal input from the A/D converter. The signal after the removal of CP is converted to information in the frequency domain by an FFT unit 702. The information in the frequency domain is formed as a digital beam by an SSP 703, and the antenna element information is changed to beam element information. A DMX 704 demaps the beam element information to resource element information in accordance with the OFDM symbol and the resolution of the subcarrier. The demapped information includes a reference signal. The reference signal is sent to a CE 705 and used to estimate the propagation channel. An MLD 706 performs MLD processing of the user data by using the estimated propagation channel. The resultant LLR is used by a DEC 707 for decoding.

Decoding starts from interference waves with high signal power, that is, the signal to the terminal 2. The signal to the terminal 2 is received with a high power, transmitted by the TD, and can be received in a poor reception environment. So, decoding succeeds almost always. The result of decoding is returned to the MLD 706 again, the effect of interference is eliminated, and an LLR is output as the signal for the terminal 1. Because the effect of interference from the signal for the terminal 2 is reduced significantly in the output LLR, the probability of successful decoding of the signal for the terminal 1 is high.

4. Pilot Signal Arrangement

Figure 15:
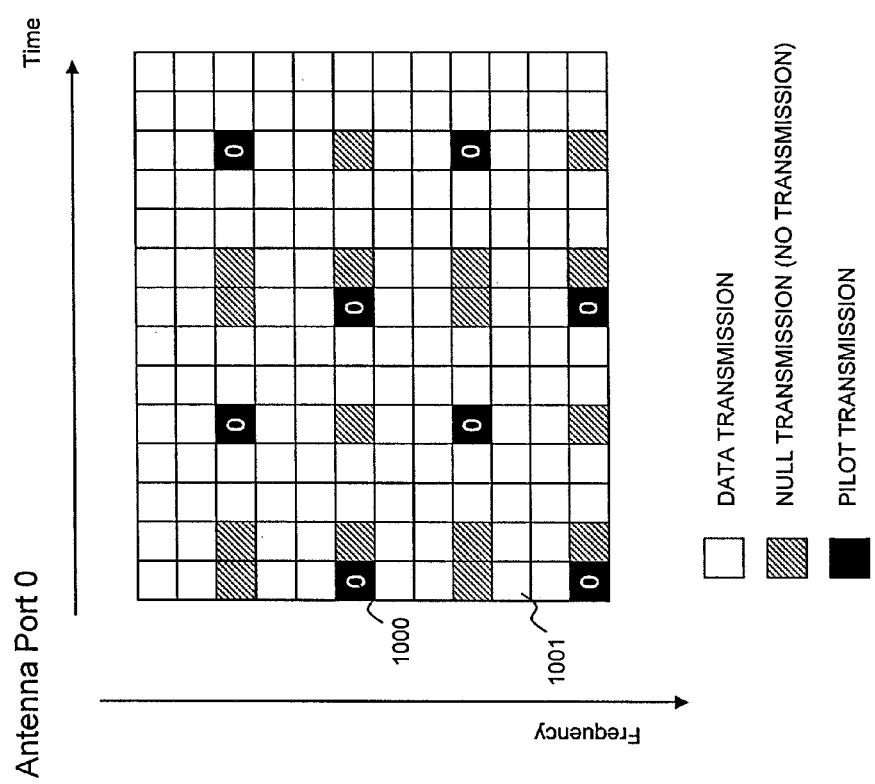
FIG. 15 shows an arrangement of pilot signals in LTE (for antenna port 0).
Figure 16:
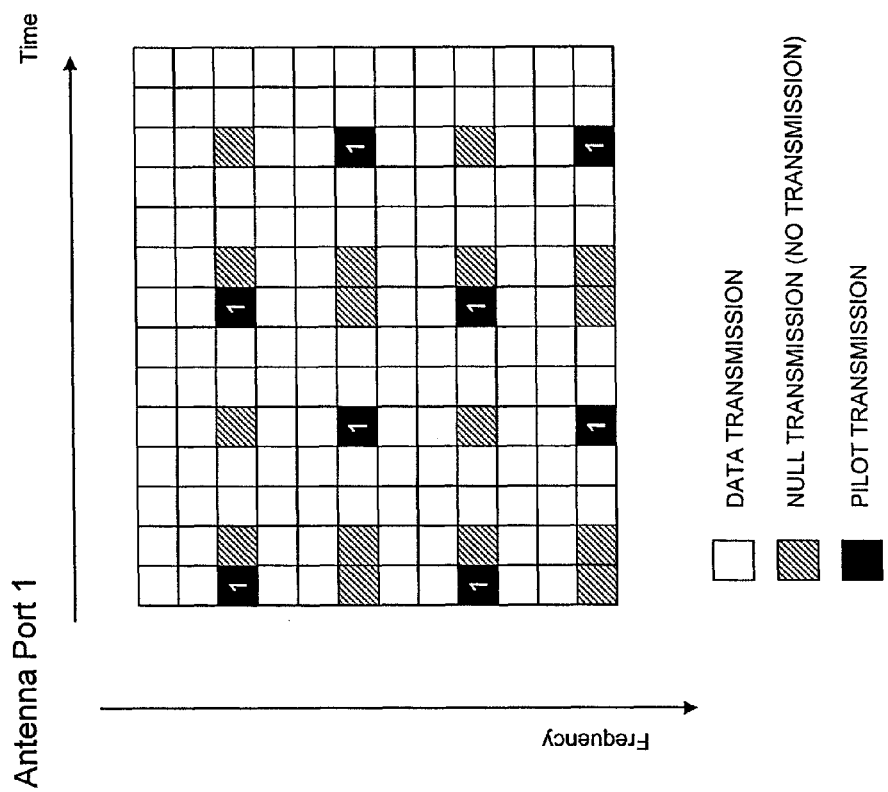
FIG. 16 shows an arrangement of pilot signals in LTE (for antenna port 1).

FIGS. 15 to 18 show arrangements of pilot signals in LTE. The horizontal axis represents the time, and the vertical axis represents the frequency. FIG. 15 shows an arrangement of pilot signals for antenna port 0. A black box containing a numeral 0 represents a pilot signal of antenna port 0. FIG. 16 shows an arrangement of pilot signals for antenna port 1. Antenna ports 0 and 1 use different resource elements for pilot signal transmission. The pilot signal is not allocated to a resource element that is used by another antenna for pilot signal transmission. Therefore, the pilot signal hardly causes interference.

Figure 17:
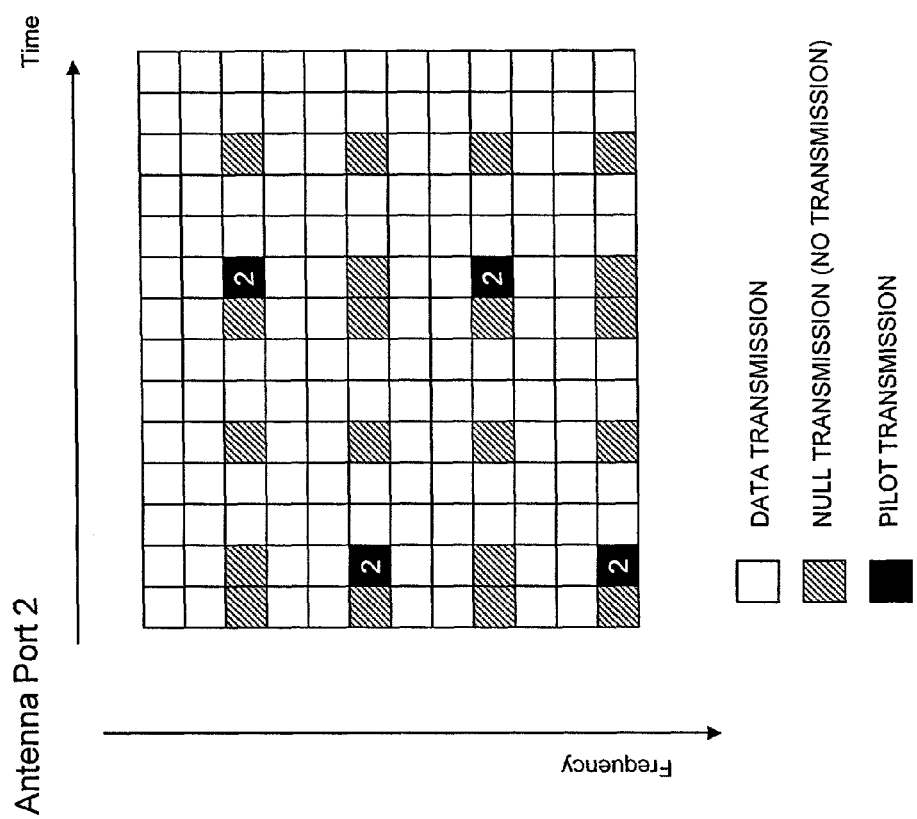
FIG. 17 shows an arrangement of pilot signals in LTE (for antenna port 2).
Figure 18:
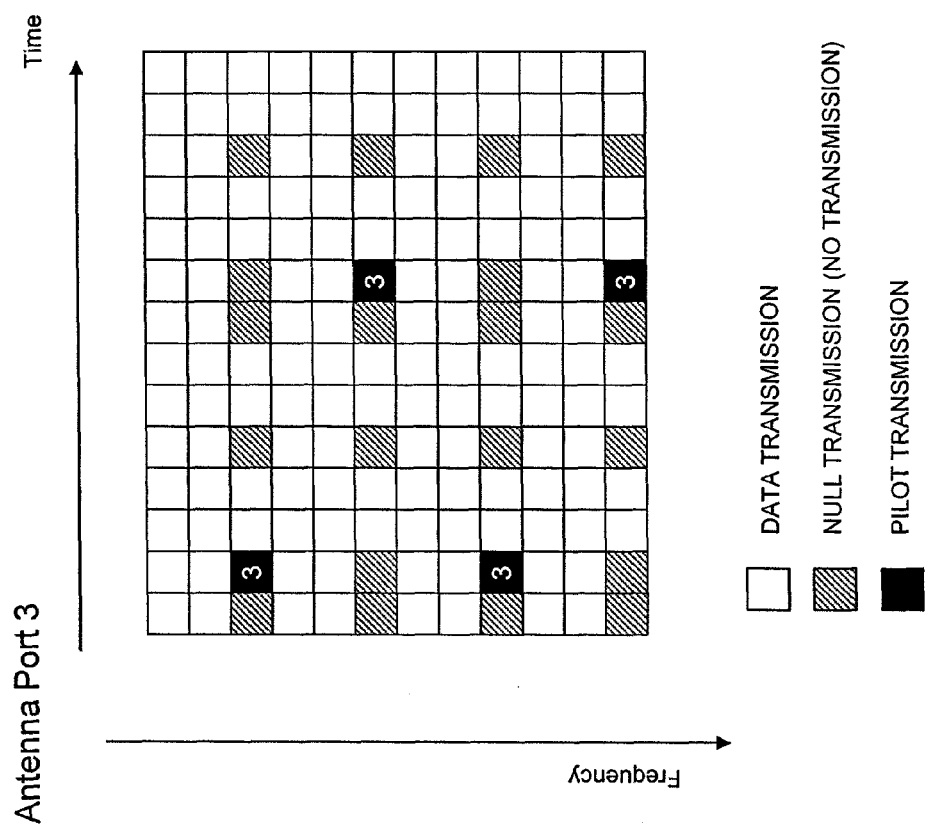
FIG. 18 shows an arrangement of pilot signals in LTE (for antenna port 3).

FIG. 17 shows an arrangement of pilot signals for antenna port 2, and FIG. 18 shows an arrangement of pilot signals for antenna port 3. The pilot signals of different antennas are mapped exclusively. Accordingly, the propagation channel can be estimated with a high precision by using the pilot signals. In MIMO transmission, in which a plurality of antennas send signals simultaneously, the propagation channel can be estimated accurately by using the pilot signals sent by the antennas.

5. Signal Transmission

The difference between this embodiment and the related art will be described by using expressions.

The signal transmission in the related art uses 2×2 antenna ports, for example, as expressed below.

$$\underbrace{\begin{bmatrix} r_{00} & r_{01} \\ r_{10} & r_{11} \end{bmatrix}}_{\text{Reception signal}} = \underbrace{\begin{bmatrix} h_{00} & h_{01} \\ h_{10} & h_{11} \end{bmatrix}}_{\text{Propagation channel}} \underbrace{\begin{bmatrix} s_0 & s_1 \\ -s_1^* & s_0^* \end{bmatrix}}_{\text{Transmission signal}} + \underbrace{\begin{bmatrix} n_{00} & n_{01} \\ n_{10} & n_{11} \end{bmatrix}}_{\text{Noise}} \quad \text{Expression 1}$$

It is thought as a model that the reception signal is obtained by applying the complex operation caused by the propagation channel to the transmission signal and then by adding noise. The coefficient 00 of the reception signal r indicates that the signal is received by a 0-th antenna at a 0-th time. The coefficient 10 indicates that the signal is received by a first antenna at a 0-th time. The reception signals r can be expressed as follows.

$$r_{00} = h_{00}s_0 - h_{01}s_1^* + n_{00}$$

$$r_{01} = h_{00}s_1 - h_{01}s_0^* + n_{01}$$

$$r_{10} = h_{10}s_0 - h_{11}s_1^* + n_{10}$$

$$r_{11} = h_{10}s_1 + h_{11}s_0^* + n_{11} \quad \text{Expression 2}$$

Here, operations expressed below are performed.

$$h_{00}^* r_{00} + h_{01} r_{01}^* = (|h_{00}|^2 + |h_{01}|^2)s_0 + n_0'$$

$$h_{10}^* r_{11} + h_{11} r_{10}^* = (|h_{10}|^2 + |h_{11}|^2)s_1 + n_1' \quad \text{Expression 3}$$

Then, transmission signals can be taken out as indicated by $s_0$ and $s_1$ outside the parentheses on the right side. This is Alamouti's code.

With the signal transmission in the embodiment, the terminal 1 obtains the reception signal expressed below, formed by combining the transmission signal and antenna arrangement as shown in FIGS. 6 and 12.

$$\underbrace{\begin{bmatrix} r_{00} & r_{01} \\ r_{10} & r_{11} \\ r_{20} & r_{21} \\ r_{30} & r_{31} \end{bmatrix}}_{\text{Reception signal}} =$$

Expression 4

$$\underbrace{\begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix}}_{\text{Propagation channel}} \underbrace{\begin{bmatrix} s_0 & s_1 \\ i_0 & i_1 \\ -s_1^* & s_0^* \\ -i_1^* & i_0^* \end{bmatrix}}_{\text{Transmission signal}} + \underbrace{\begin{bmatrix} n_{00} & n_{01} \\ n_{10} & n_{11} \\ n_{20} & n_{21} \\ n_{30} & n_{31} \end{bmatrix}}_{\text{Noise}}$$

In the expression, $s_0$ and $s_1$ represent transmission signals to the terminal 1, and $i_0$ and $i_1$ represent transmission signals to the terminal 2, or interference waves. A replica of the interference signal is deleted from the reception signal as expressed below.

$$\underbrace{\begin{bmatrix} r_{00} & r_{01} \\ r_{10} & r_{11} \\ r_{20} & r_{21} \\ r_{30} & r_{31} \end{bmatrix}}_{\text{Reception signal}} - \underbrace{\begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix}}_{\substack{\text{Estimated} \\ \text{propagation channel}}} \underbrace{\begin{bmatrix} 0 & 0 \\ i_0 & i_1 \\ 0 & 0 \\ -i_1^* & i_0^* \end{bmatrix}}_{\substack{\text{Replica of} \\ \text{interference singal}}} =$$

Expression 5

$$\underbrace{\begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix}}_{\substack{\text{Estimated} \\ \text{propagation channel}}} \underbrace{\begin{bmatrix} s_0 & s_1 \\ 0 & 0 \\ -s_1^* & s_0^* \\ 0 & 0 \end{bmatrix}}_{\text{Transmission signal}} + \underbrace{\begin{bmatrix} n_{00} & n_{01} \\ n_{10} & n_{11} \\ n_{20} & n_{21} \\ n_{30} & n_{31} \end{bmatrix}}_{\text{Noise}}$$

Then, the effect of the interference waves can be removed as represented by the right side. The coefficient 00 of the signal y after removal of the interference waves represents that the signal is received by a 0-th antenna at a 0-th time. The coefficient 10 represents that the signal is received by a first antenna at the 0-th time. The reception signal y after removal of interference is expressed as follows.

$y_{00}=r_{00}-h_{01}i_0+h_{03}i_1{}^*=h_{00}s_0-h_{02}s_1{}^*+n_{00}$ $y_{10}=r_{10}-h_{11}i_0+h_{13}i_1{}^*=h_{10}s_0-h_{12}s_1{}^*+n_{10}$ $y_{01}=r_{01}-h_{01}i_1-h_{03}i_0{}^*=h_{00}s_1+h_{02}s_0{}^*+n_{01}$ $y_{11}=r_{11}-h_{11}i_1-h_{13}i_0{}^*=h_{10}s_1+h_{12}s_0{}^*+n_{11}$ $y_{20}=r_{20}-h_{21}i_0+h_{23}i_1{}^*=h_{20}s_0-h_{22}s_1{}^*+n_{20}$ $y_{30}=r_{30}-h_{31}i_0+h_{33}i_1{}^*=h_{30}s_0-h_{32}s_1{}^*+n_{30}$ $y_{21}=r_{21}-h_{21}i_1-h_{23}i_0{}^*=h_{20}s_1+h_{22}s_0{}^*+n_{21}$ $y_{31}=r_{31}-h_{31}i_1-h_{33}i_0{}^*=h_{30}s_1+h_{32}s_0{}^*+n_{31}$ Expression 6

Here, operations expressed below are performed.

$h_{00}{}^*y_{00}+h_{02}y_{01}{}^*+h_{20}{}^*y_{20}+h_{22}y_{21}{}^*=(|h_{00}|^2+|h_{02}|^2+|h_{20}|^2+|h_{22}|^2)s_0+n_0'$ $h_{10}{}^*y_{11}-h_{12}y_{10}{}^*+h_{30}{}^*y_{31}-h_{32}y_{30}{}^*=(|h_{10}|^2+|h_{12}|^2+|h_{30}|^2+|h_{32}|^2)s_1+n_1'$ Expression 7

Then, transmission signals can be taken out as indicated by $s_0$ and $s_1$ placed outside the parentheses on the right side. The signals of the terminal 1 alone can be taken out. In related art, the terminal 1 performs the operations given by Expressions 1 to 3. In this embodiment, the signals are taken out by the operations given by Expressions 4 to 7. The terminal 2 should perform the operations given by Expressions 1 to 3. Therefore, two or more reception antennas are not always required.

What is claimed is:

1. A wireless communication system comprising plurality of base station apparatuses having a plurality of antennas, placed scatteringly in a service area to cover, wherein each of the plurality of base station apparatuses uses information on quality of a propagation channel or a channel state returned from a plurality of terminals, identifies at least two terminals A and B belonging to each of groups classified by the returned information, sends a signal to the terminal A with a predetermined reference power, determines the power of transmission to the terminal B on the basis of the information returned from the terminal A, and sends signals to the terminals A and B simultaneously or at the same timing or by the same resource element.

2. A wireless communication system according to claim 1, wherein each of the plurality of base station apparatuses classifies the plurality of terminals into terminals located around the center of a cell and terminals located around the edge of the cell in accordance with the information on the quality of the propagation channel reported by each of the plurality of terminals, identifies the terminal A as a terminal located around the edge of the cell, identifies the terminal B as a terminal located around the center of the cell, and pairs the terminals.

3. A wireless communication system according to claim 1, wherein each of the plurality of base station apparatuses maps data signals to be sent from the plurality of antennas to the terminals A and B, according to a procedure determined in advance to use antenna ports exclusively for each of the terminals and each of resource elements.

4. A wireless communication system according to claim 1, wherein the terminal B decodes a signal of the terminal A to remove interference from a signal and decodes the signal after the removal of interference.

5. A wireless communication system according to claim 1, wherein each of the plurality of base station apparatuses determines that, if the reported information exceeds a predetermined first threshold, the corresponding terminal is considered as the terminal B located around the center of a cell, and if the reported information falls below a predetermined second threshold, the terminal is considered as the terminal A located around the edge of the cell.

6. A wireless communication system according to claim 1, wherein each of the plurality of base station apparatuses determines paring by identifying one of terminals determined to be located around the edge of a cell as the terminal A; and, if the channel state reported by the terminal A, located around the edge of the cell, is higher than a third threshold, finding a terminal for which pair transmission can be performed, from a group of terminals determined to be located around the center of the cell, and identifying the terminal as the terminal B.

7. A wireless communication system according to claim 1, wherein each of the plurality of base station apparatuses determines the power of transmission to the terminal B located around the center of a cell to a value lowered from the reference power of transmission to the terminal A located around the edge of the cell by a predetermined value, if the information reported from the terminal A located around the edge of the cell is higher than a predetermined third threshold.

8. A wireless communication system according to claim 1, wherein each of the plurality of base station apparatuses sends a signal to the terminal B located around the center of a cell by using the plurality of antennas provided for the base station apparatus, with the transmission power lowered by a predetermined value from the reference transmission power to the terminal A located around the edge of the cell, and sends a signal to the terminal A located around the edge of the cell by using antennas fewer than the antennas used for sending the signal to the terminal B located around the center of the cell or a half of the antennas, with the reference power.

9. A wireless communication method comprising a plurality of base station apparatuses having a plurality of antennas, placed scatteringly in a service area to cover, wherein each of the plurality of base station apparatuses uses information on quality of a propagation channel or a channel state returned from a plurality of terminals, identifies at least two terminals A and B belonging to each of groups classified by the returned information, sends a signal to the terminal A with a predetermined reference power, determines the power of transmission to the terminal B on the basis of the information returned from the terminal A, and sends signals to the terminals A and B simultaneously or at the same timing or by the same resource element.

10. A wireless communication method according to claim 9, wherein each of the plurality of base station apparatuses classifies the plurality of terminals into terminals located around the center of a cell and terminals located around the edge of the cell in accordance with the information on the quality of the propagation channel reported by each of the plurality of terminals, identifies the terminal A as a terminal located around the edge of the cell, identifies the terminal B as a terminal located around the center of the cell, and pairs the terminals.

11. A wireless communication method according to claim 9, wherein each of the plurality of base station apparatuses maps data signals to be sent from the plurality of antennas to the terminals A and B, according to a procedure determined in advance to use antenna ports exclusively for each of the terminals and each of resource elements.

12. A wireless communication method according to claim 9, wherein each of the plurality of base station apparatuses determines that, if the reported information exceeds a predetermined first threshold, the corresponding terminal is considered as the terminal B located around the center of a cell, and if the reported information falls below a predetermined second threshold, the terminal is considered as the terminal A located around the edge of the cell.

13. A wireless communication method according to claim 9, wherein each of the plurality of base station apparatuses determines paring by identifying one of terminals determined to be located around the edge of cell as the terminal A; and, if the channel state reported by the terminal A, located around the edge of the cell, is higher than a third threshold, finding a terminal for which pair transmission can be performed, from a group of terminals determined to be located around the center of the cell, and identifying the terminal as the terminal B.

14. A wireless communication method according to claim 9, wherein each of the plurality of base station apparatuses sends a signal to the terminal B located around the center of a cell by using the plurality of antennas provided for the base station apparatus, with the transmission power lowered by a predetermined value from the reference transmission power to the terminal A located around the edge of the cell, and sends a signal to the terminal A located around the edge of the cell by using antennas fewer than the antennas used for sending the signal to the terminal B located around the center of the cell or a half of the antennas, with the reference power.

15. A base station apparatus having a plurality of antennas in a wireless communication system, the wireless communication system covering a service area by placing the base station apparatus at a plurality of points scatteringly in the service area, the base station apparatus comprising:
a processor which uses information on quality of propagation channel or a channel state, returned from a plurality of terminals, identifies at least two terminals A and B belonging to each of groups classified by the returned information, and determines the power of transmission to the terminal B or a power control value for determining the transmission power, on the basis of the information returned from the terminal A; and
a transmission signal processing unit which sends a signal to the terminal A with a predetermined reference power, determines the power of transmission to the terminal B in accordance with the transmission power or power control value given by the processor, and sends signals to the terminals A and B simultaneously or at the same timing or by the same resource element.

16. A base station apparatus according to claim 15, wherein the processor classifies the plurality of terminals into terminals located around the center of a cell and terminals located around the edge of the cell in accordance with the information on the quality of the propagation channel reported by each of the plurality of terminals, identifies the terminal A as a terminal located around the edge of the cell, identifies the terminal B as a terminal located around the center of the cell, and pairs the terminals.

17. A base station apparatus according to claim 15, wherein the transmission signal processing unit maps data signals to be sent from the plurality of antennas to the terminals A and B, according to a procedure determined in advance to use antenna ports exclusively for each of the terminals and each of resource elements.

18. A base station apparatus according to claim 15, wherein the processor determines that, if the reported information exceeds a predetermined first threshold, the corresponding terminal is considered as the terminal B located around the center of a cell, and if the reported information falls below a predetermined second threshold, the terminal is considered as the terminal A located around the edge of the cell.

19. A base station apparatus according to claim 15, wherein the processor determines paring by identifying one of terminals determined to be located around the edge of a cell as the terminal A; and, if the channel state reported by the terminal A, located around the edge of the cell, is higher than a third threshold, finding a terminal for which pair transmission can be performed, from a group of terminals determined to be located around the center of the cell, and identifying the terminal as the terminal B.

20. A base station apparatus according to claim 15, wherein transmission signal processing unit sends a signal to the terminal B located around the center of a cell by using the plurality of antennas provided for the base station apparatus, with the transmission power lowered by a predetermined value from the reference transmission power to the terminal A located around the edge of the cell, and sends a signal to the terminal A located around the edge of the cell by using antennas fewer than the antennas used for sending the signal to the terminal B located around the center of the cell or a half of the antennas, with the reference power.

* * * * *